(12) United States Patent
Yamagata et al.

(10) Patent No.: US 8,256,402 B2
(45) Date of Patent: Sep. 4, 2012

(54) EXHAUST PASSAGE STRUCTURE OF MULTI-CYLINDER ENGINE

(75) Inventors: Naoyuki Yamagata, Hiroshima (JP); Susumu Masuyama, Hiroshima (JP); Osamu Aoki, Hiroshima (JP)

(73) Assignee: Mazda Motor Corporation (JP)

( * ) Notice: Subject to any disclaimer, the term of this patent is extended or adjusted under 35 U.S.C. 154(b) by 257 days.

(21) Appl. No.: 12/692,201

(22) Filed: Jan. 22, 2010

(65) Prior Publication Data

US 2010/0206265 A1      Aug. 19, 2010

(30) Foreign Application Priority Data

Feb. 13, 2009   (JP) .................... 2009-030901

(51) Int. Cl.
*F02B 33/00* (2006.01)
*F02D 23/00* (2006.01)
*F01N 1/18* (2006.01)

(52) U.S. Cl. ............ 123/559.1; 60/602; 60/323; 60/324

(58) Field of Classification Search .............. 123/337, 123/559.1; 60/281, 288, 292, 304, 305, 306, 60/309, 323, 324, 605.1, 602
See application file for complete search history.

(56) References Cited

U.S. PATENT DOCUMENTS

| | | | | |
|---|---|---|---|---|
| 4,443,153 A * | 4/1984 | Dibelius | ....................... | 415/151 |
| 4,611,465 A * | 9/1986 | Kato et al. | ....................... | 60/602 |
| 4,813,232 A * | 3/1989 | Hitomi et al. | .................... | 60/313 |
| 4,993,227 A * | 2/1991 | Nagura et al. | ................ | 60/605.1 |
| 4,998,951 A * | 3/1991 | Kawamura | ....................... | 60/608 |
| 5,560,208 A * | 10/1996 | Halimi et al. | .................... | 60/608 |
| 6,079,211 A * | 6/2000 | Woollenweber et al. | ........ | 60/612 |
| 6,250,079 B1 * | 6/2001 | Zander et al. | .................... | 60/602 |
| 7,637,106 B2 * | 12/2009 | Hertweck et al. | ............... | 60/602 |
| 7,644,586 B2 * | 1/2010 | Yamagata | ....................... | 60/612 |
| 7,849,683 B2 * | 12/2010 | Asame et al. | .................... | 60/323 |
| 8,047,177 B2 * | 11/2011 | Kong et al. | ................ | 123/193.5 |
| 8,051,648 B2 * | 11/2011 | Son et al. | ......................... | 60/323 |
| 2005/0011193 A1 * | 1/2005 | Pagot | .............................. | 60/606 |
| 2006/0064981 A1 * | 3/2006 | Kojima et al. | ................... | 60/612 |
| 2006/0266026 A1 * | 11/2006 | Kato et al. | ........................ | 60/324 |
| 2009/0094978 A1 * | 4/2009 | Yamagata et al. | ............. | 60/602 |
| 2010/0126153 A1 * | 5/2010 | Nagafuchi | ....................... | 60/299 |
| 2011/0239638 A1 * | 10/2011 | Yamagata et al. | ............. | 60/324 |

FOREIGN PATENT DOCUMENTS

| | | | |
|---|---|---|---|
| EP | 2 218 886 | * | 8/2010 |
| JP | 2007-231791 A | | 9/2007 |
| JP | 2010-185402 | * | 8/2010 |

* cited by examiner

*Primary Examiner* — Hai Huynh
(74) *Attorney, Agent, or Firm* — Studebaker & Brackett PC; Donald R. Studebaker (57) ABSTRACT

Three or more independent passages are coupled to respective cylinders which are different from each other, and a collective portion where the independent passages collect is provided. An exhaust turbocharger is arranged downstream of the collective portion. Rotary throttle valves are arranged respectively in the independent passages upstream of the collective portion. At least two of the throttle valves are supported by a common rotary axis. The independent passages with the throttle valves supported by the common rotary axis are coupled to cylinders which have exhaust strokes which are not adjacent to each other. Accordingly, the exhaust gas can be supplied to the exhaust turbocharger efficiently.

11 Claims, 9 Drawing Sheets

EXHAUST PASSAGE STRUCTURE OF MULTI-CYLINDER ENGINE

BACKGROUND OF THE INVENTION

The present invention relates to an exhaust passage structure of a multi-cylinder engine.

In an engine equipped with an exhaust turbocharger, the exhaust gas from plural cylinders flows down in an exhaust manifold toward a collective portion. The exhaust turbocharger is arranged downstream of the collective portion. It is preferable that the exhaust gas from exhaust ports of the engine, i.e., the blow down gas, be supplied to the exhaust turbocharger without weakening its flowing-down power in order to make the exhaust turbocharger operate efficiently.

Japanese Patent Laid-Open Publication No. 2007-231791 proposes the structure in which the exhaust turbocharger is arranged downstream of the collective portion where the independent passages of the exhaust manifold collect, and the nozzle to direct the exhaust gas flow toward the center of the collective portion is arranged at the collective portion, so that the exhaust gas can be supplied to the exhaust turbocharger with the properly strong flowing-down power.

In general, the exhaust passage upstream of the exhaust turbocharger branches into plural independent passages which are coupled to the cylinders which are different from each other. Herein, the gas flowing downward in a specified independent passage flows toward another independent passage and expands, so that the flowing-down power of the exhaust gas flowing to the exhaust turbocharger decreases. Consequently, it may be difficult to make the exhaust turbocharger operate efficiently. According to the structure of the above-described publication, while the exhaust gas flowing down into the collective portion is concentrated toward the exhaust turbocharger, it may be difficult that the gas from a specified independent passage is prevented from flowing into another independent passage.

SUMMARY OF THE INVENTION

The present invention has been devised considering the above-described matters, and an object of the present invention is to provide an exhaust passage structure of a multi-cylinder engine which can supply the exhaust gas to the exhaust turbocharger efficiently.

According to the present invention, there is an exhaust passage structure of a multi-cylinder engine which has a valve-overlapping term when an intake valve in an intake stroke and an exhaust valve in an exhaust stroke open together for a specified period of time, comprising three or more independent passages coupled to respective cylinders which are different from each other, a collective portion where the independent passages collect, an exhaust turbocharger arranged downstream of the collective portion, rotary throttle valves arranged respectively in the independent passages upstream of the collective portion, wherein at least two of the throttle valves are supported by a common rotary axis, and the independent passages in which the two of the throttle valves supported by the common rotary axis are arranged are coupled to cylinders which have exhaust strokes which are not adjacent to each other.

According to the present invention, the exhaust gas flowing down through a throttle portion formed by the throttle valve can provide the ejector effect (suction effect). That is, the speed of the exhaust gas flowing down through the throttle portion is increased and supplied to the exhaust turbocharger. Thereby, the exhaust gas flowing down in a specified independent passage can be directly supplied to the exhaust turbocharger without making the exhaust gas expanding into another independent passage. Particularly, the above-described suction effect is increased by the exhaust gas, i.e., the blow down gas, having a high speed when the exhaust ports of the engine open. Further, this suction effect can improve the scavenging effect that a specified cylinder is scavenged properly by the exhaust gas from another cylinder, so that the volumetric efficiency of the specified cylinder can be increased (by 10-20%). Further, in case of the dynamic supercharging utilizing the pulsation of the exhaust gas, since the exhaust gas flowing down in the specified independent passage is prevented from flowing (expanding) into the other independent passage, the effect similar to a situation in which the volume of the exhaust passage is properly decreased can be provided and the effect of the dynamic supercharging can be increased (the momentary flowing amount of the blow down gas having the high speed can be supplied to the exhaust turbocharger effectively). Thus, the engine torque at a low engine speed, in particular, can be improved greatly. Of course, when a large amount of exhaust gas is generated at a high load and high engine speed, for example, the exhaustion of the exhaust gas can be achieved properly by opening the throttle valve.

In addition, since the plural throttle valves are supported by the common rotary axis, compactness, reduction of the parts number, cost reduction and so on can be properly achieved. Since the independent passages in which the plural throttle valves supported by the common rotary axis are arranged are coupled to the cylinders which have exhaust strokes which are not adjacent to each other, even if some amount of gas is leaked from a gap formed around the common rotary axis into the other independent passage, this leaking gas would not cause any problem (exhaust interference).

That is, in case the engine has the valve-overlapping term when an intake valve in the intake stroke and an exhaust valve in the exhaust stroke open together for a specified period of time, a problem of deterioration of the scavenging effect may occur between two cylinders which have adjacent ignition timings. Namely, in case a piston of the cylinder having the late ignition timing is going up with its exhaust valve open while the above-described both intake and exhaust valves open during the lowering of a piston of the cylinder having the early ignition timing (in its intake stroke), some exhaust (burned) gas of the cylinder having the late ignition timing may be leaked through the gap formed around the rotary axis of the throttle valve into the exhaust passage of the cylinder having the early ignition timing. Thereby, the pressure of the cylinder having the early ignition timing downstream of the rotary axis may be increased, so that the scavenging effect may be deteriorated. According to the present invention, however, since the independent passages in which the plural throttle valves supported by the common rotary axis are arranged are coupled to the cylinders which have exhaust strokes which are not adjacent to each other, the above-described leaking (exhaust interference) of the exhaust gas of the cylinder having the late ignition timing into the exhaust passage of the cylinder having the early ignition timing can be restrained.

According to an embodiment of the present invention, the throttle valve is a butterfly valve. Thereby, the throttle valve can be comprised of a simple valve structure.

According to another embodiment of the present invention, the plural independent passages are arranged so as to surround a substantial center of the collective portion. Thereby, the above-described suction effect can be properly improved. That is, the suction effect can be preferably improved by setting the disposition angle between downstream end portions of the respective independent passages to be as small as possible (being parallel to each other may be ideal). Herein, arranging the downstream end portions of the independent passages so as to surround the center of the collective portion can make the disposition angle between the downstream end portions of the independent passages properly small, so that the suction effect can be properly improved. Further, the above-described disposition enables the distance between the independent passages to be considerably short, thereby improving the suction effect more. Moreover, the above-described disposition can properly set the degrees of the suction effect caused by the exhaust gas flowing down in the independent passages to be similar to each other.

According to another embodiment of the present invention, the multi-cylinder engine is an inline four-cylinder engine which has Nos. 1, 2, 3 and 4 cylinders arranged in an inline shape and the Nos. 2 and 3 cylinders positioned at a center portion of the engine have exhaust strokes thereof which are not adjacent to each other, the independent passages comprise a No. 1 independent passage connecting to an exhaust port of the No. 1 cylinder, a No. 2 independent passage connecting to respective exhaust ports of the Nos. 2 and 3 cylinders, and a No. 3 independent passage connecting to an exhaust port of the No. 4 cylinder, and the throttle valve arranged in the No. 1 independent passage and the throttle valve arranged in the No. 3 independent passage are supported by the common rotary axis. Thereby, the angle of the respective portions of the independent passages near the collective portion can be made smaller, keeping the number of the independent passages fewer.

According to another embodiment of the present invention, the multi-cylinder engine is an inline four-cylinder engine, the independent passages are four independent passages which are coupled respectively to four cylinders of the four-cylinder engine, downstream end portions of the four independent passages are arranged so as to surround a substantial center of said collective portion, specified two independent passages are arranged along a first rotary-axis line, the other two independent passages are arranged along a second rotary-axis line which is provided in parallel to the first rotary-axis line, and the throttle valves of the specified two independent passages have the common rotary axis and the throttle valves of the other two independent passages have another common rotary axis. Thereby, the number of the rotary axes can be kept fewer properly despite of proving the independent passages which are coupled to each of the cylinders.

According to another embodiment of the present invention, the independent passages are formed in an exhaust manifold, a middle member is arranged between the exhaust manifold and the exhaust turbocharger, the collective portion and respective downstream portions of the independent passages are formed in the middle member, an actuator to drive the rotary axes of the throttle valves is provided, and the downstream portions of the independent passages formed in the middle member are arranged in parallel to each other. Thereby, the present invention can be properly materialized by using the middle member, adopting the similar structures of the exhaust manifold and the exhaust turbocharger to the conventional ones. Further, since the downstream portions of the independent passages formed in the middle member are arranged in parallel to each other, the above-described suction effect can be provided properly.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
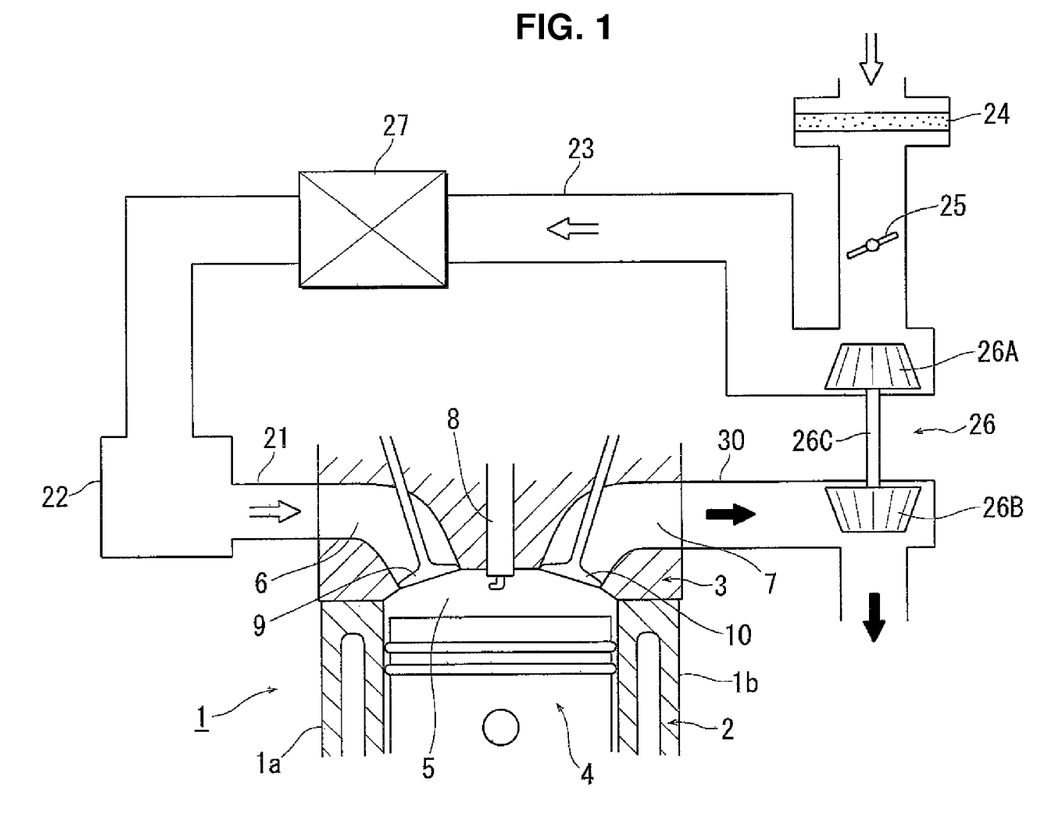
FIG. 1 is a system diagram showing an example of an engine to which the present invention is applied.

In FIG. 1, reference numeral 1 denotes an engine (engine body) which is an inline four-cylinder spark-ignition type of engine according the embodiment. Reference numerals 2, 3 and 4 denote a cylinder block, a cylinder head, and a piston, respectively. A combustion chamber 5 is formed by these parts 2, 3 and 4. An intake port 6 and an exhaust port 7 which are formed in the cylinder head 3 open into the combustion chamber 5. A spark plug 8 is arranged at a central portion of the combustion chamber 5. The intake port 6 is opened or closed by an intake valve 9, and the exhaust port 7 is opened or closed by an exhaust valve 10.

The intake port 6 connects to a surge tank 22 via an independent passage 21 which is formed in an intake manifold. A single common intake passage 23 is coupled to the surge tank 22. In the common intake passage 23, an air cleaner 24, a throttle valve 25, a compressor wheel 26A of the exhaust turbocharger 26, and an intercooler 27 are arranged in order from its upstream portion toward its downstream portion.

The exhaust port 7 connects to an exhaust passage 30, which will be described below in detail, and a turbine wheel 26B of the exhaust turbocharger 26 is provided in this exhaust passage 30. The turbine wheel 26B is coupled to the compressor wheel 26A via a connecting shaft 26C so that the compressor wheel 26A can be driven by the turbine wheel 26B which receives the energy of the exhaust gas. Thereby, the supercharging is conducted. Herein, in case the supercharging pressure is a specified pressure or higher, a waste gate valve, not illustrated, is opened so that the supercharging pressure can be adjusted to be lower than the specified pressure.

Figure 2:
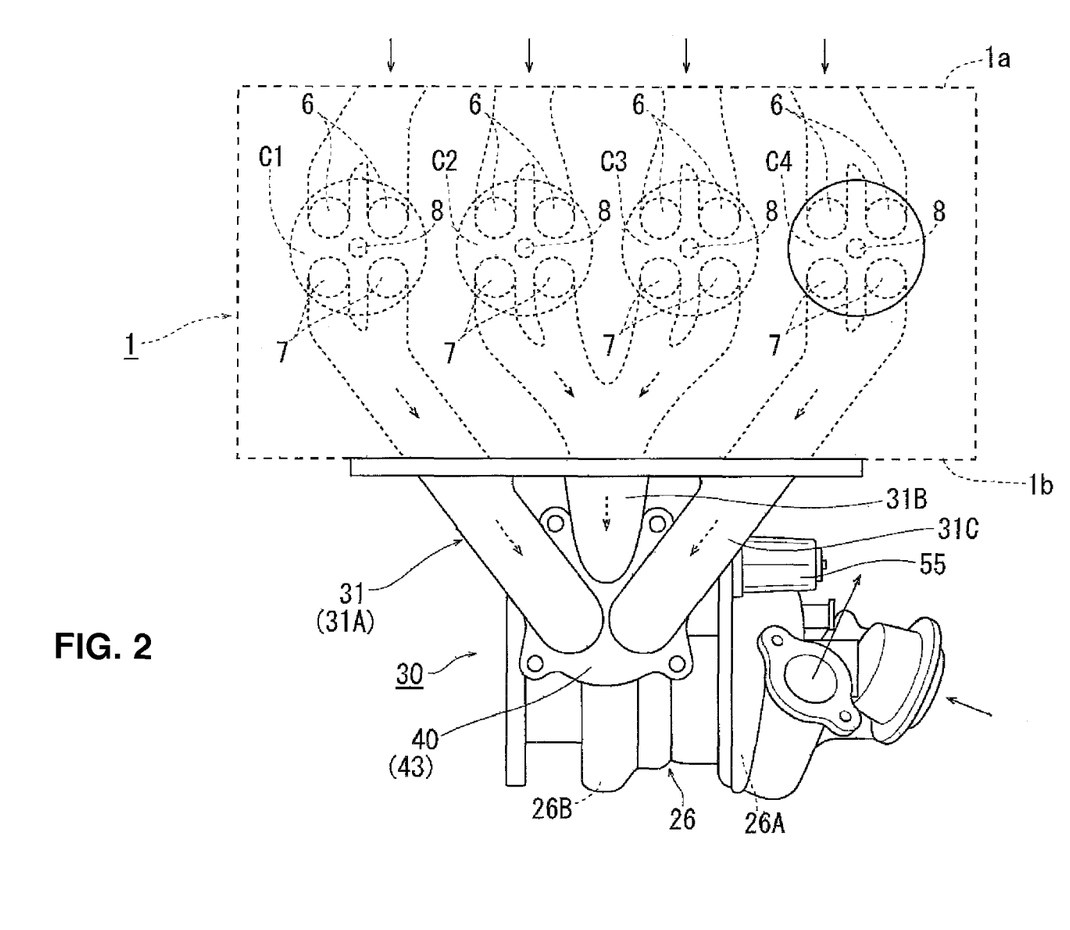
FIG. 2 is a plan view specifically showing an exhaust passage of the engine of FIG. 1.

In FIG. 2, the inline four cylinders of the engine 1 are denoted by reference characters C1, C2, C3 and C4. The cylinder C1 is a No. 1 cylinder, the cylinder C2 is a No. 2 cylinder, the cylinder C3 is a No. 3 cylinder, and the cylinder C4 is a No. 4 cylinder. The order of the ignition timing (the order of the exhaust stroke) of these cylinders C1, C2, C3 and C4 is set to be the order of No. 1 cylinder C1, No. 3 cylinder C3, No. 4 cylinder C4, and No. 2 cylinder C2 in the embodiment. That is, the ignition timings (the exhaust stroke) of the No. 2 cylinder and the No. 3 cylinder at the central portion of the engine are not adjacent to each other. Further, each of the cylinders of the engine is configured to have the valve-overlapping term when the intake valve 9 in the intake stroke and the exhaust valve 10 in the exhaust stroke open together for a specified period of time. That is, the open timing of the intake vale is set to be prior to the top dead center of the piston, while the closing timing of the exhaust valve is set to be after this top dead center of the piston. Accordingly, for the two cylinders which have the ignition timings are adjacent to each other, the term when the intake and exhaust valves of the cylinder having the early ignition timing open during its piston going down (in the intake stroke) partially overlaps with the term when the exhaust valve of the cylinder having the late ignition timing opens during its piston going up. Hereinafter, the cylinder may be described by using the reference character C simply when it is generally explained.

Each cylinder C has two intake ports 6 (two intake valves 9) and two exhaust ports 7 (two exhaust valves 10). The intake ports 6 of the cylinder C branch downstream near the intake valves 9. An outside end of their collective part in the cylinder head 3 opens at a side face 1a of the engine 1. Likewise, the exhaust ports 7 of the cylinder C branch downstream near the exhaust valves 10, and an outside end of their collective part in the cylinder head 3 opens at another side face 1b of the engine 1. The exhaust ports 9 of the No. 2 cylinder C2 and the No. 3 cylinder C3 are collected in the cylinder head 3 and their collective part opens at the side face 1b of the engine 1.

Figure 3:
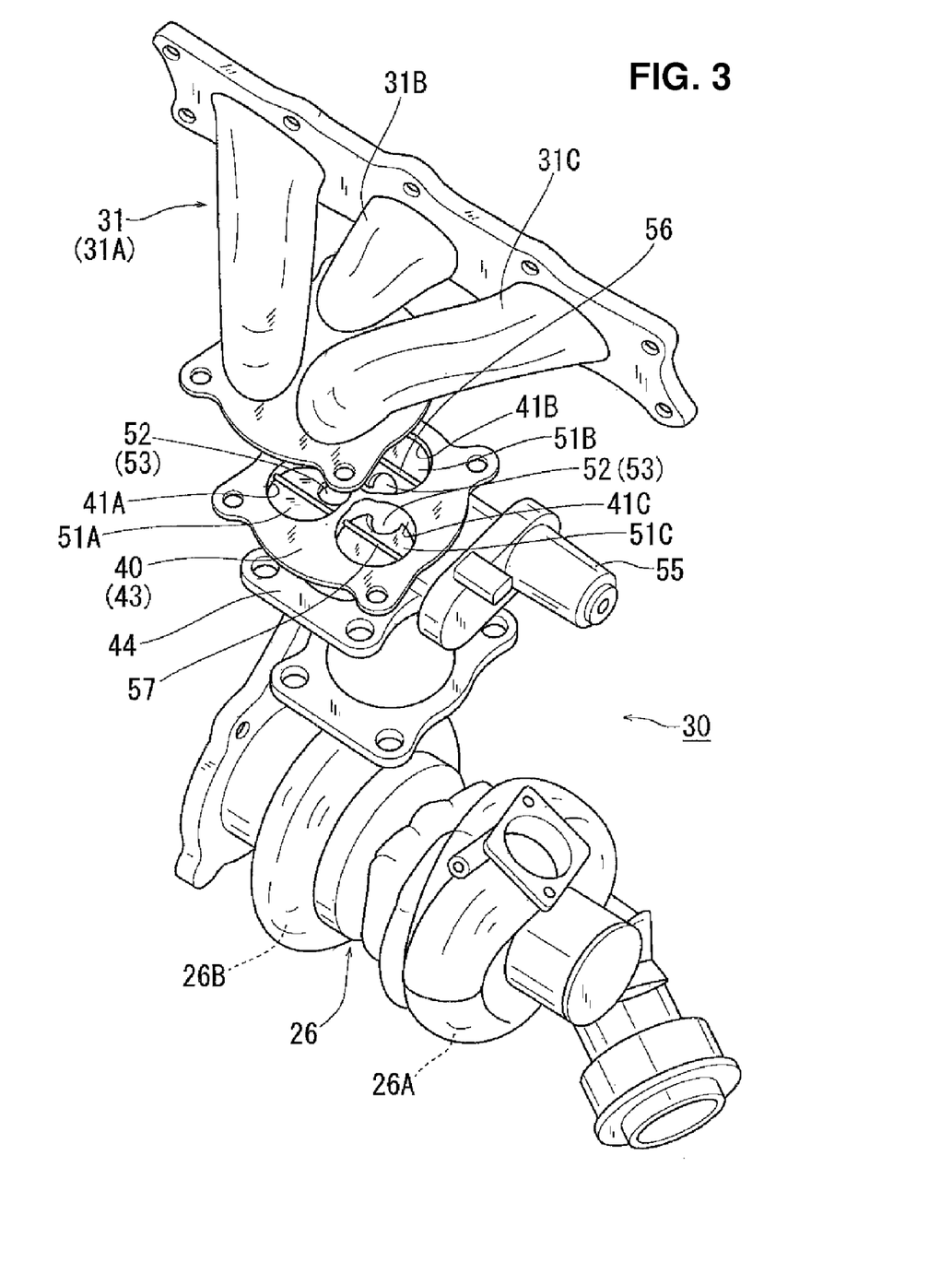
FIG. 3 is an exploded perspective view of the exhaust passage shown in FIG. 2.
Figure 4:
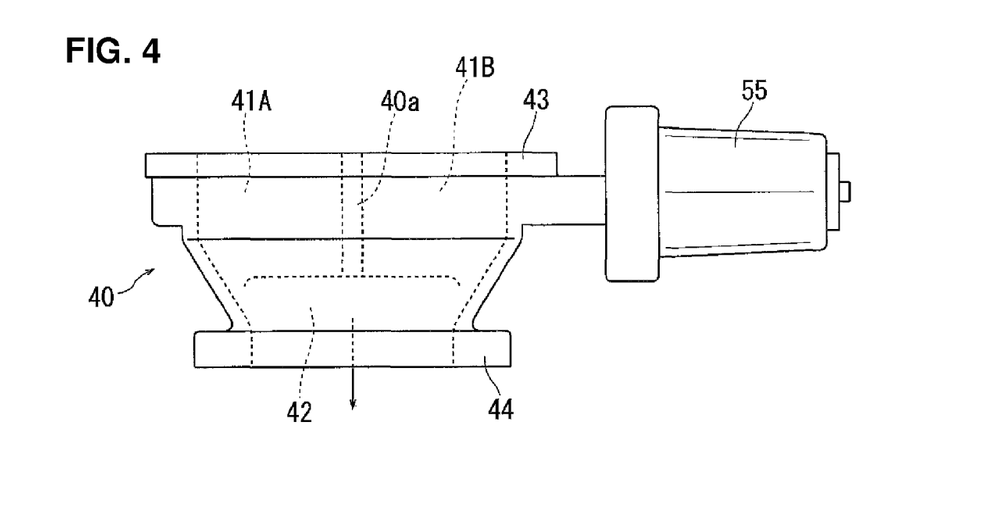
FIG. 4 is a side view of a middle member.
Figure 5:
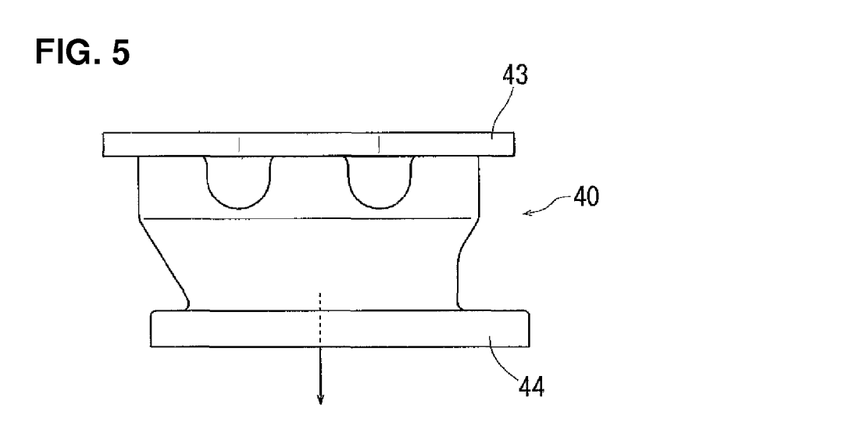
FIG. 5 is a left side view of FIG. 4.
Figure 6:
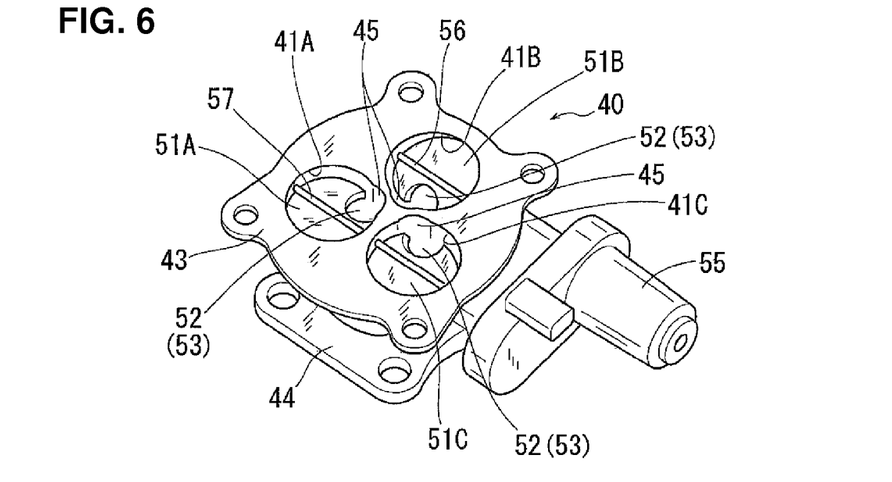
FIG. 6 is an upper perspective view of the middle member.

In FIGS. 2 and 3, an exhaust manifold which constitutes part of the exhaust passage 30 is denoted by reference character 31. The exhaust manifold 31 comprises three independent branch pipes (independent passages), 31A, 31B and 31C. The No. 1 branch pipe 31A on one side is coupled to the No. 1 cylinder C1 so as to connect to its exhaust ports 7. The No. 2 branch pipe 31B at the center is coupled to the No. 2 cylinder C2 and the No. 3 cylinder C3 so as to connect to their exhaust ports 7. Tthe No. 3 branch pipe 31C on the other side is coupled to the No. 4 cylinder C4 so as to connect to its exhaust ports 7.

The above-described exhaust turbocharger 26 is coupled to the exhaust manifold 31 via a middle member 40. Three independent passages 41A, 41B and 41C which are partitioned from each other by a partition wall 40a are formed at an upstream end portion of the middle member 40. The independent passages 41A, 41B and 41C are in parallel to each other. Herein, the independent passage 41A is coupled to the branch pipe 31A of the exhaust manifold 31. The independent passage 41B is coupled to the branch pipe 31B of the exhaust manifold 31. The independent passage 41C is coupled to the branch pipe 31C of the exhaust manifold 31.

A collective portion 42 is formed downstream in the middle member 40, where respective downstream ends of the independent passages 41A, 41B and 41C collect. The middle member 40 is connected integrally with the downstream end of the exhaust manifold 31 by an upstream flange 43. The middle member 40 is connected integrally with an inlet end of the exhaust turbocharger 26 by a downstream flange 44. The middle member 40 is formed such that the opening area of the specified part from the independent passages 41A, 41B and 41C to the collective portion 42 becomes narrower gradually with a downstream end of the collective portion 42 having a circular opening area. Herein, the downstream end of the collective portion 42 has the shape and size which is similar to that of the inlet port of the exhaust turbocharger 26.

The independent passages 41A, 41B and 41C in the middle member 40 are arranged so as to surround the center (substantial center) of the collective portion 42. That is, the two independent passages 41A, 41B are arranged side by side in parallel to the disposition direction of cylinders, and the center independent passage 41B is positioned between the independent passages 41A, 41C. That is, the independent passages 41A, 41B and 41C are arranged zigzag in the disposition direction of cylinders. The independent passages 41A, 41B and 41C have a circular cross section with a convex portion 45. A peripheral portion of the independent passage at the convex portion 45 projects outward (toward the center of the collective portion 42). In other words, the independent passages 41A, 41B and 41C are arranged such that the center of each of these passages (substantial center) is positioned on a circular locus having its center at the center (substantial center) of the collective portion 42. Thus, the independent passages 41A, 41B and 41C are arranged around the center of the collective portion 42 substantially at regular intervals.

Figure 7:
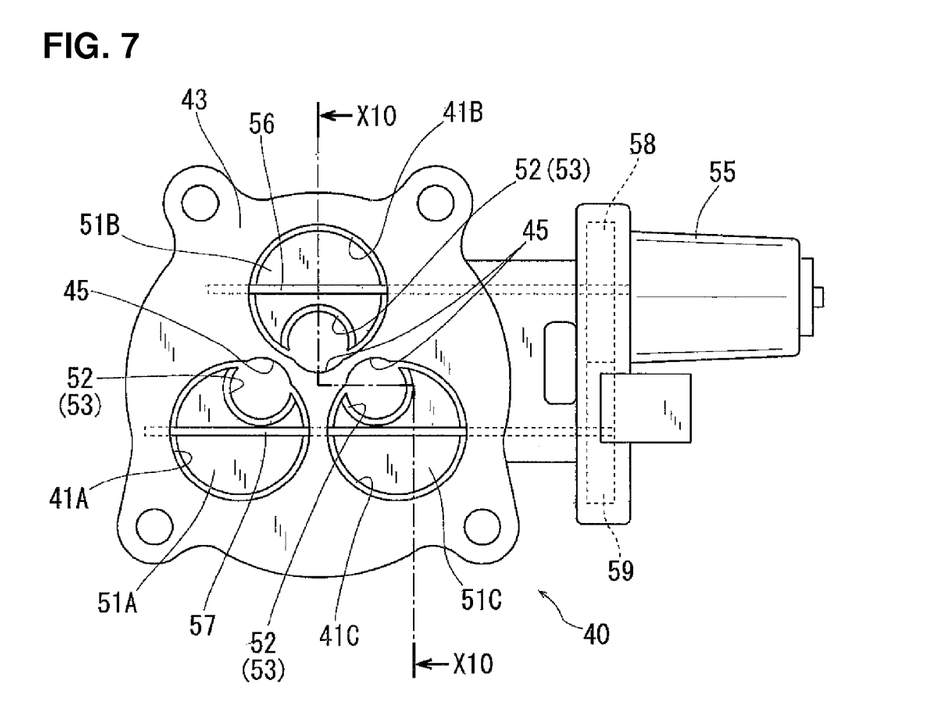
FIG. 7 is a plan view of the middle member, when viewed from the side of an attaching face to an exhaust manifold.
Figure 8:
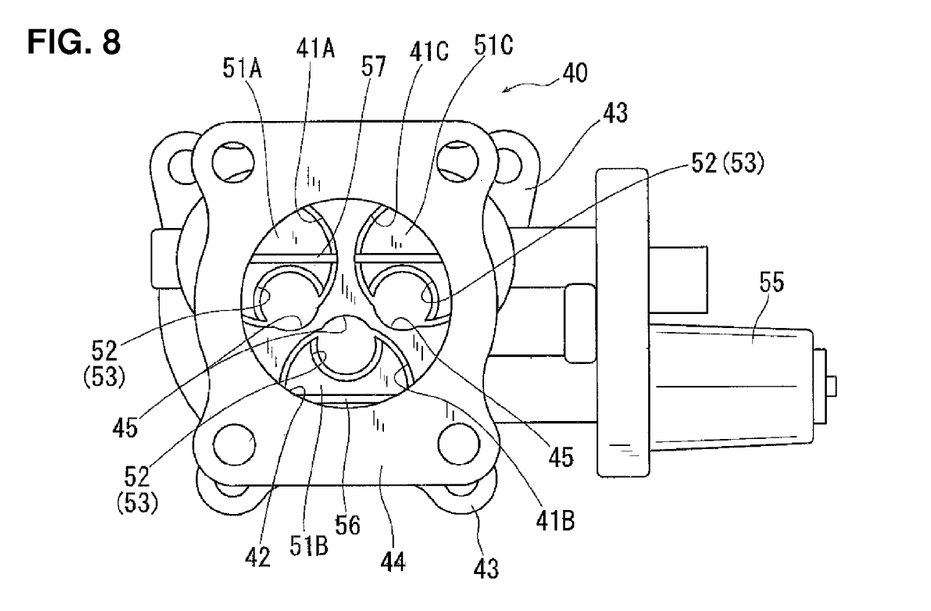
FIG. 8 is a plan view of the middle member, when viewed from the side of an attaching face to an exhaust turbocharger.
Figure 9:
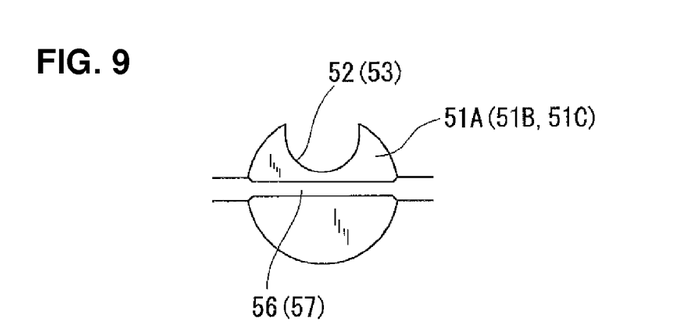
FIG. 9 is a plan view showing an example of a butterfly valve as a throttle valve.
Figure 10:
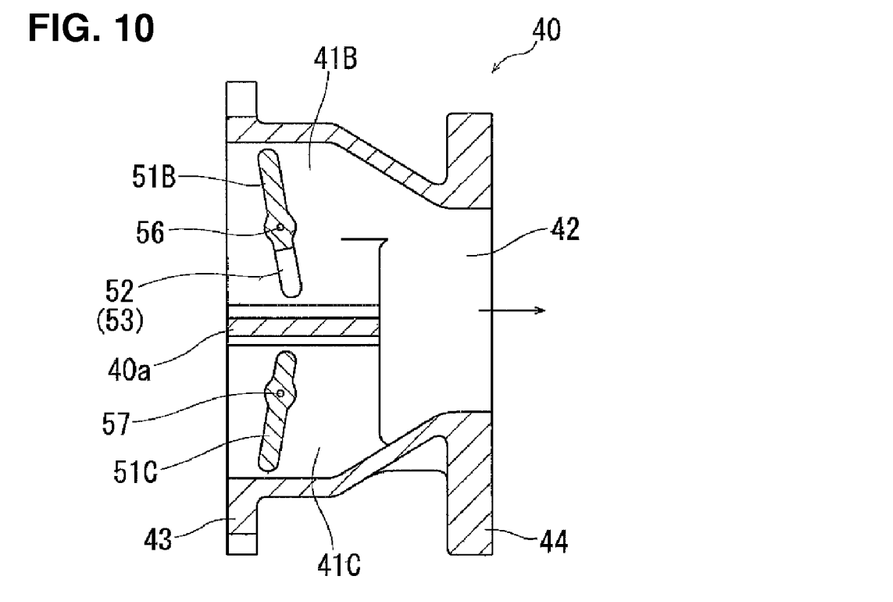
FIG. 10 is a sectional view taken along line A-A of FIG. 7, which shows a state in which the butterfly valve is fully closed.
Figure 11:
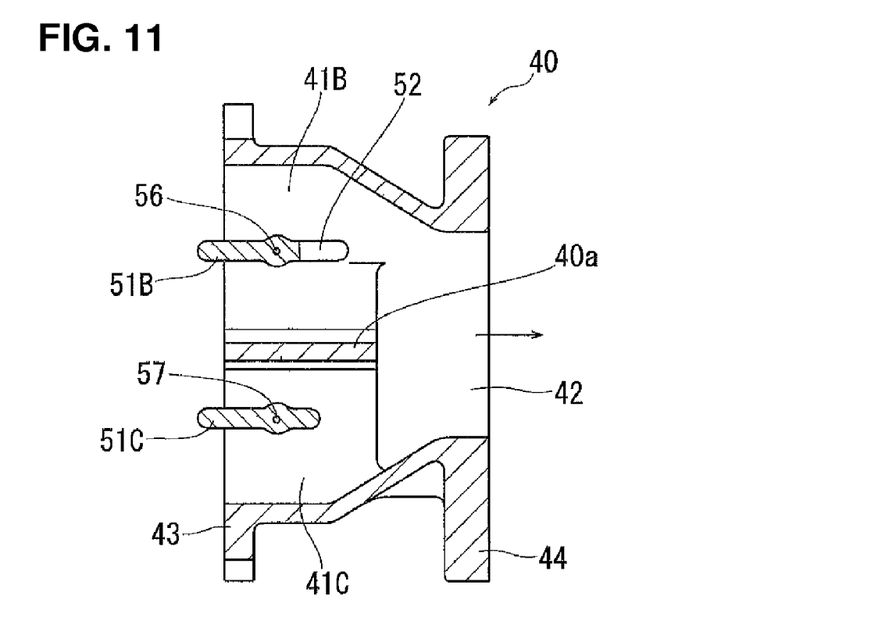
FIG. 11 is a sectional view showing a state in which the butterfly valve is fully open, which corresponds to FIG. 10.

Butterfly valves 51A, 51B and 51C as the throttle valve are provided in the respective independent passages 41A, 41B and 41C of the middle member 40. Each of these butterfly valves 51A, 51B and 51C has an arch-shaped notch 52 at its periphery. This notch 52 forms a circular opening, i.e., a throttle portion 53, together with the above-described convex portion 45 of the independent passages 41A, 41B, 41C when the butterfly valves 51A, 51B, 51C are closed as shown in FIGS. 7, 8 and 10. Further, when the butterfly valves 51A, 51B, 51C open (fully open) by being rotated by about 90 degrees from their closing position, the opening area of the independent passages 41A, 41B, 41C are enlarged as shown in FIG. 11.

The butterfly valves 51A, 51B, 51C are driven by an actuator 55, which is comprised of an electromagnetic motor or the like. That is, the butterfly valve 51B is fixed to a rotary axis 56 which is rotatably supported at the middle member 40, and the buttery valves 51A, 51C are fixed to another rotary axis 57 which is rotatably supported at the middle member 40. Respective ends of these rotary axes 56, 57 extend outside of the middle member 40, and these axes 56, 57 are configured to rotate together via gears 58, 59 (see FIG. 7) which are fixed to the above-described extending ends. The actuator 55 is coupled to the rotary axis 56. Thereby, according to the drive of the rotary axis 56 by the actuator 55, the opening of the butterfly valves 51A, 51B, 51C are adjusted, keeping the same angle (this adjusted opening angle may take a double stage with a full open and a full close, a triple stage with a middle open additionally, or more variable stepwise or continuous stages).

Figure 12:
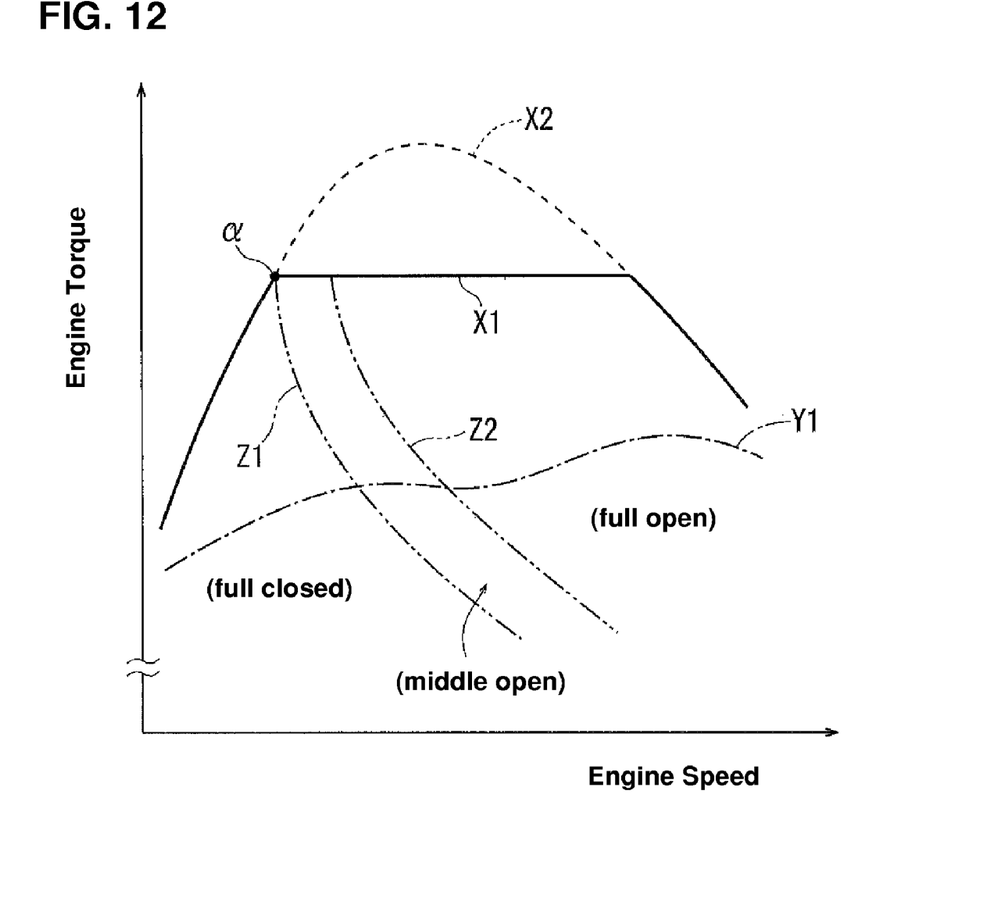
FIG. 12 is an opening-closing control map for the butterfly valve.

FIG. 12 shows an example of a map which controls the opening of the butterfly valves 51A, 51B, 51C. In this map of FIG. 12, the engine speed and the engine torque (or the supercharging pressure, or the engine load) are set as control parameters. A solid line X1 shows the engine torque in case of supercharging with the exhaust turbocharger 26, and a point a in the figure is the intercept point (the point when the waste gate valve opens). A broken line X2 on the high-torque side of the line X1 shows the engine torque when the waste gate valve is not opened. Further, a one-dotted broken line Y1 shows the engine torque which corresponds to a natural air-intake without supercharging by the exhaust turbocharger 26.

A line Z1 shows an equal-horsepower curve which passes the above-described point a, and a line Z2 shows another equal-horsepower curve which is located slightly on the high-speed side of the line Z1. The butterfly valves 51A, 51B, 51C are fully closed in a lower speed area than the line Z1, while they are fully opened in a higher speed area than the line Z2. Further, in an area between the lines Z1, Z2, the butterfly valves 51A, 51B, 51C have a middle opening between the full close and the full open. This middle opening changes so as to become greater continually and variably as the engine speed becomes higher.

Herein, the independent passage reaching the collective portion 42 of the cylinder C is constituted by a passage which extends from the exhaust port 7 to the independent passage 41A-41C of the middle member 40 by way of the branch pipe 31A-31C of the exhaust manifold 31. The respective total volumes of the above-described independent passage reaching the collective portion 42 of the cylinders C1-C4 are set to be equal to each other. Specifically, for example, the total volume of the No. 1 cylinder C1 is the sum of the respective volumes of its exhaust port 7, the first branch pipe 31A of the exhaust manifold 31, and the independent passage 41A of the middle member 40. Likewise, the total volume of the No. 4 cylinder C4 is the sum of the respective volumes of its exhaust port 7, the third branch pipe 31C of the exhaust manifold 31, and the independent passage 41C of the middle member 40. Meanwhile, the total volume of the No. 2 cylinder C2 or the No. 3 cylinder C3 is the sum of the respective volumes of the exhaust port 7 of the cylinder C2 or C3, the second branch pipe 31B of the exhaust manifold 31, and the independent passage 41B of the middle member 40.

Herein, the respective total volumes of the independent passage of the cylinders C1-C4 are equal to each other, and the No. 2 cylinder C2 and the No. 3 cylinder C3 have the double volume of the exhaust port. Therefore, the volume of the No. 2 branch pipe 31B of the exhaust manifold for the No. 2 cylinder C2 and the No. 3 cylinder C3 is set to be smaller than that of the other branch pipes 31A or 31C. Further, since the respective cross section areas of the branch pipes 31A, 31B and 31C are set to be almost equal to each other, the length of the No. 2 branch pipe 31B is set to be shorter than that of the other branch pipes 31A or 31C (the branch pipes 31A, 31C have the same length). The downstream end portions of the branch pipes 31A-31C extend substantially perpendicularly to the upstream flange 43 of the middle member 40 and collect at the collective portion with the considerably small disposition angles among them. In addition, the independent passages 41A-41C in the middle member 40 are arranged in parallel to each other with the more smaller disposition angles among them.

In the above-described constitution, the butterfly valves 51A, 51B, 51C are fully closed at the low engine-speed area (the area below the line Z1e in FIG. 12), so that the opening areas of the independent passages 41A-41C are controlled to be the smallest. Each of these smallest opening areas (the opening areas of the throttle portions 53) is formed by the convex portion 45 and the notch 52.

The exhaust gas flowing down to the collective portion 42 from the each cylinder in the exhaust stroke through the exhaust port 7 is increased in its flowing speed at the throttle portion 53 (the convex portion 45 and the notch 52), and then supplied to the exhaust turbocharger 26 by way of the collective portion 42. Thereby, the exhaust turbocharger 26 operates efficiently. In particular, since the exhaust gas having the high speed (blow down gas) at the timing of the exhaust port 7 (exhaust valve 10) opening is supplied to the exhaust turbocharger 26, the engine torque can be properly improved.

The ejector effect (suction effect) is achieved by the speed increase of the exhaust gas at the throttle portion, so that the exhaust gas flowing down in the specified independent passage can be prevented from flowing (expanding) into the other independent passage. Further, the remaining gas in the other independent passage is supplied to the exhaust turbocharger 26 by the suction effect, so that the engine torque can be improved.

Moreover, this suction effect improves the scavenging effect of the cylinder in the intake stroke, so that the volumetric efficiency can be increased (by about 10-20%), thereby further improving the engine torque. Herein, relationships between the cylinder and the exhaust/intake strokes are the No. 1 cylinder C1 (exhaust stroke) and the No. 2 cylinder C2 (intake stroke), the No. 2 cylinder C2 (exhaust stroke) and the No. 4 cylinder C4 (intake stroke), the No. 3 cylinder C3 (exhaust stroke) and the No. 1 cylinder C1 (intake stroke), and the No. 4 cylinder C4 (exhaust stroke) and the No. 3 cylinder C3 (intake stroke).

Since the downstream end portions of the branch pipes 31A-31C of the exhaust manifold 31 are arranged substantially in parallel to each other and the independent passages 41A-41C just upstream of the collective portion 42 are parallel (completely parallel) to each other, the above-described suction effect can be properly improved. Further, since the independent passages 41A-41C are arranged closely to each other, the suction effect at the respective independent passages can be properly improved. Particularly, since the throttle portion 53 which is formed by the convex portion 45 and the notch 52 is positioned near the center of the collective portion 41, the suction effect can be improved further.

Moreover, since the independent passages 41A-41C are arranged so as to have the same relative-position relationships and the total volumes of the independent passages for the respective cylinders C1-C4 are equal to each other, the same suction effect can be provided to the respective independent passages.

Herein, in case of using the dynamic supercharging, it is preferable that the volume of the passage in which the exhaust gas flows be made as small as possible. The above-described suction effect can prevent the situation in which the exhaust gas of the specified independent passage flows (expands) into the other independent passage, so that substantially the same effect as the small passage volume can be provided. Herein, if the suction effect is not provided, part of the exhaust gas of the specified independent passage may flow into the other independent passage. Accordingly, the passage volume becomes substantially so large that the effect of the dynamic supercharging may deteriorate.

While the leaking of the exhaust gas from the gap formed around the rotary axes 56, 57 may be one of the causes of deteriorating the suction effect, since the rotary axis 57 is the common axis for both the No. 1 cylinder C1 and the No. 4 cylinder C4 which have exhaust strokes which are not adjacent to each other, the leaking of the exhaust gas from the gap formed around the rotary axis 57 may not cause any problem. Herein, the change in the openings of the butterfly valves 51A-51C is not be so sensitive to the suction effect, so the similar suction effect may be obtained as long as those are within a specified opening range.

When the engine speed increases to be in the high-speed area above the line Z2 in FIG. 12, the butterfly valves 51A-51C fully open and thereby lots of exhaust gas can be exhausted efficiently. In the engine-speed area between the lines Z1 and Z2 in FIG. 12, the openings of the butterfly valves 51A-51C are increased so that both the efficient exhaustion and the suction effect of the exhaust gas can be provided having a good balance therebetween.

Embodiment 2

Figure 13:
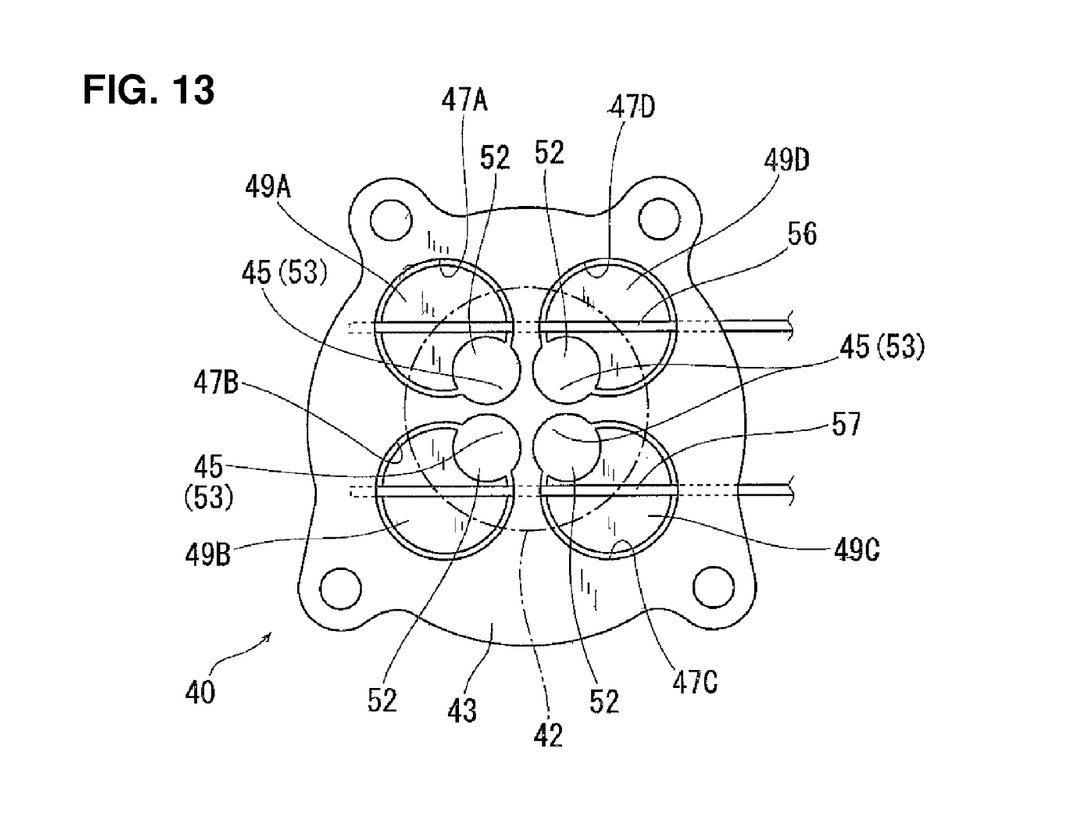
FIG. 13 is a plan view of a major portion according to a second embodiment, which corresponds to FIG. 7.

FIG. 13 shows a second embodiment of the present invention, and the same components as those of the above-described first embodiment are denoted by the same reference characters, descriptions of which are omitted here. In the present embodiment, the inline four-cylinder engine has the independent passages provided for each cylinder. That is, the exhaust manifold (37, not illustrated) has four branch pipes (37A-37D, not illustrated) for each cylinder, and the four independent passages 47A-47D (corresponding to the independent passages 41A-41C of the first embodiment) are formed in the middle member 40. The respective independent passages 47A-47D are arranged so as to surround the substantial center of the collective portion 42, that is, they are arranged around the (substantial) center of the collective portion 42 substantially at regular intervals.

The independent passages 47A-47D have the convex portion 45 which projects toward the center of the collective portion 42. Butterfly valves 49A-49D (corresponding to the butterfly valves 51A-51C of the first embodiment) are provided in the independent passages 47A-47D. Each of the butterfly valves 49A-49D has the notch 52, and each throttle portion 53 is formed by the convex portions 45 and the notches 53 like the above-described first embodiment.

Herein, the independent passage 47A is the No. 1 cylinder C1, the independent passage 47B is the No. 2 cylinder C2, the independent passage 47C is the No. 3 cylinder C3, and the independent passage 47D is the No. 4 cylinder C4. The common rotary axis 56 is provided for the No. 1 cylinder C1 and the No. 4 cylinder C4 which have exhaust strokes which are not adjacent to each other. Likewise, the common rotary axis 57 is provided for the No. 2 cylinder C2 and the No. 3 cylinder C3 which have exhaust strokes which are not adjacent to each other. Herein, the independent passages 47A-47D are arranged such that a connection line which connects the center of the independent passage 47B and the center of the independent passage 47D is perpendicular to a connection line which connects the center of the independent passage 47A and the center of the independent passage 47C. Of course, the rotary axes 56 and 57 are in parallel to each other.

The present invention should not be limited to the above-descried embodiments, and any other modifications and improvements may be applied within the scope of a sprit of the present invention. The present invention is applicable to other multi-cylinder engines than the four-cylinder engine. For example, in a three-cylinder engine, the branch pipes 31A-31C are coupled to the three cylinders, respectively (the center branch pipe 31B of the embodiments may be provided for the center cylinder). In a six-cylinder engine (an inline six-cylinder engine, a V-shaped six-cylinder engine), a couple of exhaust turbochargers 26 is provided for two groups of cylinders, each of which comprises three cylinders (two sets of exhaust passage structure for a three-cylinder engine may be applied). In an eight-cylinder engine, particularly, a V-shaped eight-cylinder engine, a couple of exhaust turbochargers 26 is provided for two groups of cylinders, each of which comprises four cylinders (two sets of exhaust passage structure for a four-cylinder engine may be applied).

Further, any type of throttle valve including a swing type is applicable as long as it is the rotary type. The throttle portion 53 may be formed only either one of the convex portion 45 and the notch 52. The middle member 40 may be formed integrally with the downstream end portion of the exhaust manifold 31 instead of providing the middle member 40 separately. Any type of engine, such as a compressive ignition engine of a diesel engine other than the spark-ignition engine and a rotary engine other than the reciprocating engine, may be applied.

What is claimed is:

1. An exhaust passage structure of a multi-cylinder engine which has a valve-overlapping term when an intake valve in an intake stroke and an exhaust valve in an exhaust stroke open together for a specified period of time, comprising:
   three or more independent passages coupled to respective cylinders which are different from each other, at least two of the independent passages being separate passages which are coupled to a single cylinder independently, and at least one of the independent passages being a common passage which is coupled to plural cylinders in common;
   a collective portion where said three or more independent passages collect;
   an exhaust turbocharger arranged downstream of said collective portion;
   rotary throttle valves arranged respectively in said three or more independent passages upstream of said collective portion, each of the rotary throttle valves being capable of providing a throttle portion where an opening area of the passage formed therewith is reduced in a specified engine operational state,
   wherein said throttle valves which are arranged in said at least two of the independent passages coupled to the single cylinder independently are supported by a common rotary axis, and the cylinders to which said independent passages equipped with said throttle valves supported by the common rotary axis are coupled have exhaust strokes which are not adjacent to each other.

2. The exhaust passage structure of a multi-cylinder engine of claim 1, wherein said throttle valve is a butterfly valve.

3. The exhaust passage structure of a multi-cylinder engine of claim 2, wherein said plural independent passages are arranged so as to surround a substantial center of said collective portion.

4. The exhaust passage structure of a multi-cylinder engine of claim 3, wherein said independent passages are formed in an exhaust manifold, a middle member is arranged between said exhaust manifold and said exhaust turbocharger, said collective portion and respective downstream portions of the independent passages are formed in said middle member, an actuator to drive said rotary axes of the throttle valves is provided, and said downstream portions of the independent passages formed in the middle member are arranged in parallel to each other.

5. The exhaust passage structure of a multi-cylinder engine of claim 1, wherein said throttle valve has a notch at a periphery thereof, and said throttle portion where the opening area of the passage formed therewith is reduced is comprised of at least by said notch.

6. The exhaust passage structure of a multi-cylinder engine of claim 1, wherein said specified engine operational state in which said throttle portion is provided includes at least a low engine-speed area.

7. An exhaust passage structure of an inline four-cylinder engine which has a valve-overlapping term when an intake valve in an intake stroke and an exhaust valve in an exhaust stroke open together for a specified period of time, comprising:
   Nos. 1, 2, 3 and 4 cylinders arranged in an inline shape, the Nos. 1 and 4 cylinders being positioned at both-side end portions of the engine and having exhaust strokes thereof which are not adjacent to each other, the Nos. 2 and 3 cylinders being positioned at a center portion of the engine and having exhaust strokes thereof which are not adjacent to each other;

No. 1, 2 and 3 independent passages, the No. 1 independent passage being coupled to said No. 1 cylinder, the No. 2 independent passage being coupled to said Nos. 2 and 3 cylinders in common, the No. 3 independent passage being coupled to said No. 4 cylinder;

a collective portion where said Nos. 1, 2 and 3 independent passages collect;

an exhaust turbocharger arranged downstream of said collective portion; and three rotary throttle valves arranged respectively in said Nos. 1, 2 and 3 independent passages upstream of said collective portion, each of the rotary throttle valves being capable of providing a throttle portion where an opening area of the passage formed therewith is reduced in a specified engine operational state, wherein said throttle valve arranged in the No. 1 independent passage and said throttle valve arranged in the No. 3 independent passage are supported by a common rotary axis.

8. An exhaust passage structure of an inline four-cylinder engine which has a valve-overlapping term when an intake valve in an intake stroke and an exhaust valve in an exhaust stroke open together for a specified period of time, comprising:

Nos. 1, 2, 3 and 4 cylinders arranged in an inline shape, the Nos. 1 and 4 cylinders being positioned at both-side end portions of the engine and having exhaust strokes thereof which are not adjacent to each other, the Nos. 2 and 3 cylinders being positioned at a center portion of the engine and having exhaust strokes thereof which are not adjacent to each other;

four independent passages coupled respectively to said four cylinders of the four-cylinder engine independently;

a collective portion where said four independent passages collect;

an exhaust turbocharger arranged downstream of said collective portion; and four throttle valves arranged respectively in said four independent passages upstream of said collective portion, each of the rotary throttle valves being capable of providing a throttle portion where an opening area of the passage formed therewith is reduced in a specified engine operational state, wherein said throttle valve arranged in the independent passage coupled to said No. 1 cylinder and said throttle valve arranged in the independent passage coupled to said No. 4 cylinder are supported by a common rotary axis, and said throttle valve arranged in the independent passage coupled to said No. 2 cylinder and said throttle valve arranged in the independent passage coupled to said No. 3 cylinder are supported by another common rotary axis.

9. An exhaust passage structure of a multi-cylinder engine which has a valve-overlapping term when an intake valve in an intake stroke and an exhaust valve in an exhaust stroke open together for a specified period of time, comprising:

three or more independent passages respectively coupled to a single cylinder of the engine independently;

a collective portion where said three or more independent passages collect;

an exhaust turbocharger arranged downstream of said collective portion;

rotary throttle valves arranged respectively in said three or more independent passages upstream of said collective portion, each of the rotary throttle valves being capable of providing a throttle portion where an opening area of the passage formed therewith is reduced in a specified engine operational state, wherein at least two of said throttle valves arranged in the three or more independent passages are supported by a common rotary axis, and the cylinders to which said independent passages equipped with said throttle valves supported by the common rotary axis are coupled have exhaust strokes which are not adjacent to each other.

10. The exhaust passage structure of a multi-cylinder engine of claim 9, wherein said throttle valve has a notch at a periphery thereof, and said throttle portion where the opening area of the passage formed therewith is reduced is comprised of at least by said notch.

11. The exhaust passage structure of a multi-cylinder engine of claim 9, wherein said specified engine operational state in which said throttle portion is provided includes at least a low engine-speed area.

* * * * *